Aug. 16, 1960 H. W. TAYLOR 2,949,238
PROJECTORS FOR WATER DRINKING FOUNTAINS
Filed June 27, 1957 2 Sheets-Sheet 1

INVENTOR.
Halsey W. Taylor
BY
Attorney

Aug. 16, 1960     H. W. TAYLOR     2,949,238
PROJECTORS FOR WATER DRINKING FOUNTAINS
Filed June 27, 1957     2 Sheets-Sheet 2
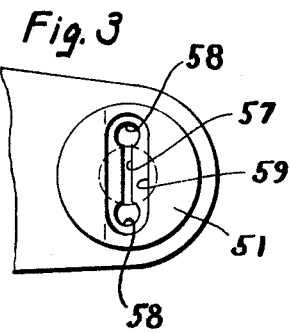
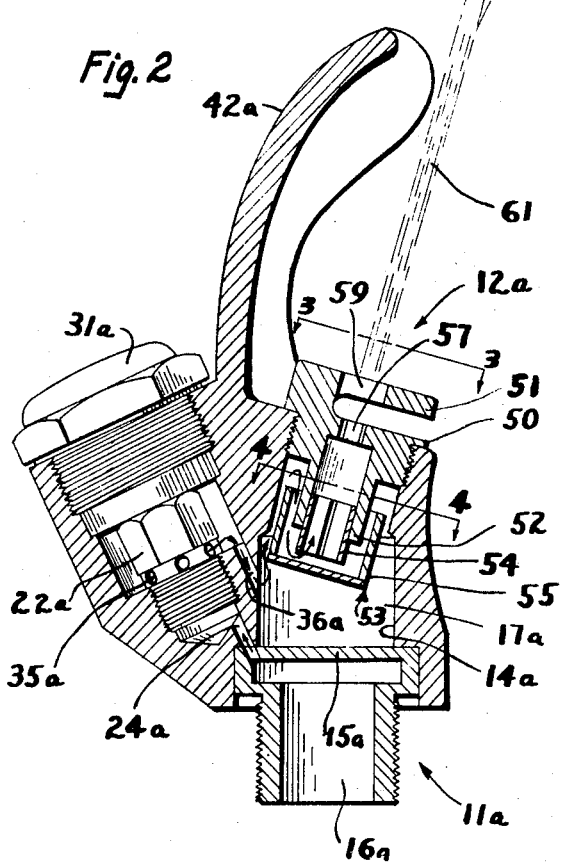
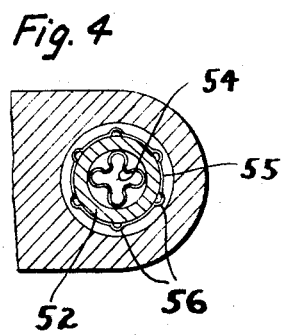
INVENTOR.
Halsey W. Taylor
BY
Attorney

United States Patent Office 2,949,238
Patented Aug. 16, 1960

2,949,238

PROJECTORS FOR WATER DRINKING FOUNTAINS

Halsey W. Taylor, 137 North NW., Warren, Ohio

Filed June 27, 1957, Ser. No. 668,477

1 Claim. (Cl. 239—31)

My invention relates to a projector for a water drinking fountain and the principal object of my invention is to provide new and improved drinking water projectors.

This invention may be used with equal facility to project refrigerated or non-refrigerated water and provides a relatively inexpensive means to produce an inclined jet of water of definite and permanent shape.

An annoying feature of prior art drinking fountains is that the stream of water issuing from the projector may suddenly vary, either in heighth or in consistency. Heighth variations are usually caused by variations in pressure whereas consistency changes are usually caused by turbulence in the water although it will be appreciated that one or the other of these factors, or both, may be the cause of variations in heighth or consistency.

Through use of my invention, the variations and changes are eliminated and the result is a uniform stream of drinking water which does not materially alter in heighth or consistency.

In the drawings accompanying this specification and forming a part of this application, there are shown, for purposes of illustration, several embodiments which my invention may assume, and in these drawings, Figure 1 is a sectional view of a water projector illustrating an embodiment of my invention.

Figure 2 is a sectional view of another embodiment of my invention, parts being shown in elevation.

Figure 3 is a fragmentary plan view corresponding generally to the line 3—3 of Figure 2, and Figure 4 is a fragmentary sectional view corresponding generally to the line 4—4 of Figure 2.

Figure 1:
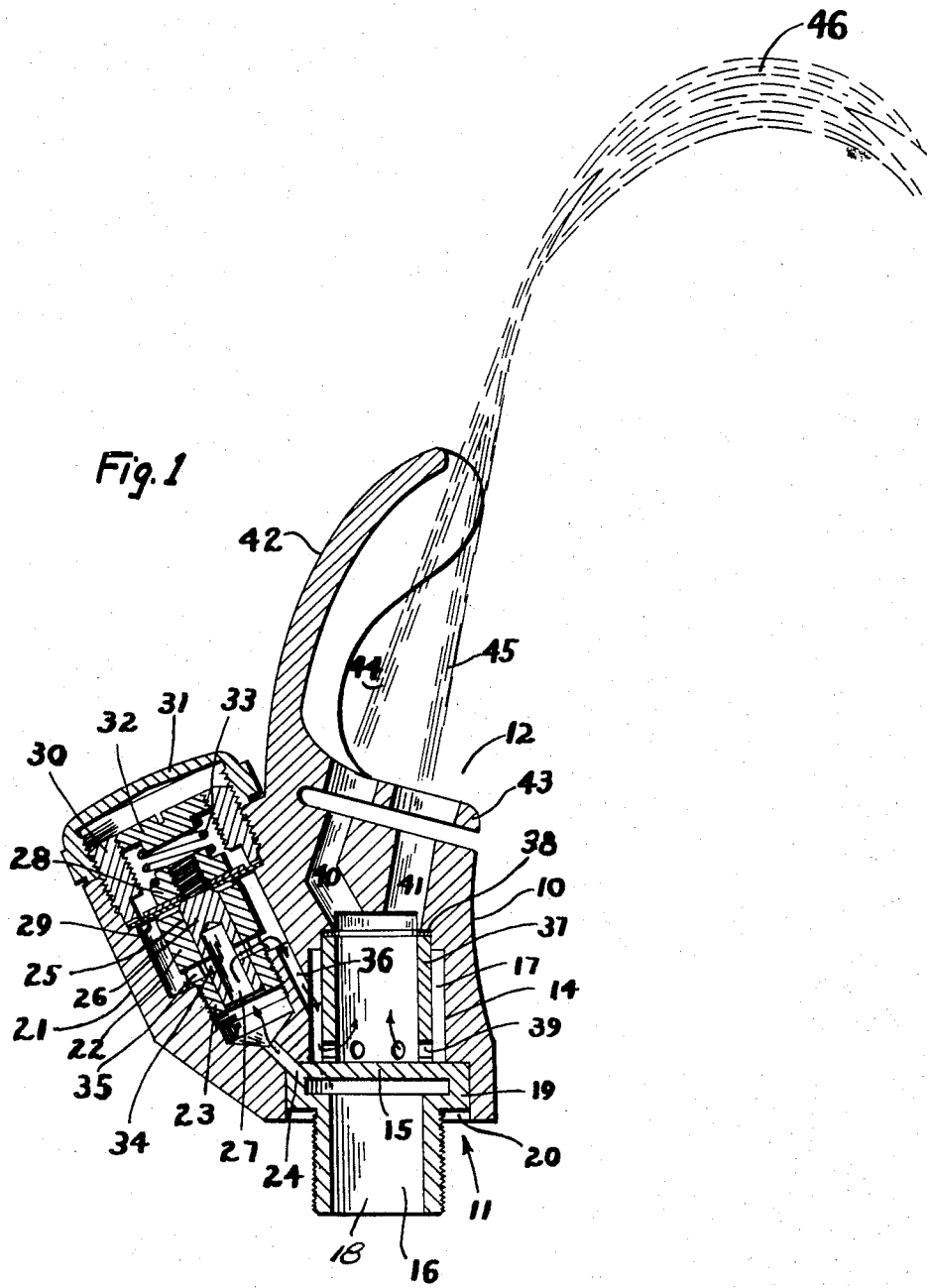

Referring particularly to Figure 1, the embodiment of the invention therein disclosed comprises a hollow projector body 10 which may be formed of any suitable rigid material, a metallic material being presently preferred. The lower end of the body is formed as a water inlet 11 and the upper end is formed as a water outlet 12 where water issues in an upright arched stream for consumption.

The body 10 is formed with a passage 14 which is divided by a wall 15 to provide an inlet part 16 which is connectable to a source of water and an outlet part 17 which communicates with the outlet 12. In the presently disclosed embodiment, the wall 15 is formed as an end cap of a pipe fitting 18, the fitting having a threaded lower end for screw connection with a conduit (not shown) leading from a source of water. As before indicated, the source may be the storage tank of a water refrigerating unit, or it may be a pipe leading from the household water supply.

The upper end of the fitting is formed as an annular enlargement 19 which seats in an enlarged and correspondingly portion 20 of the body passage 14. Threaded engagement of the fitting 18 with the water conduit may be used to secure the fitting in seating relationship within recess 20.

The projector body, in the present instance, is formed with a side enlargement 21 to house a pressure regulator which may be of any suitable type. As herein shown, the regulator mechanism includes a nipple 22 which has a lower end 23 threaded into an opening in the body enlargement 21, and the latter opening communicates with the interior of the pipe fitting 18 through a port 24.

The nipple 22 has a through bore 25 for slidably receiving a plunger 26. The lower end of the plunger is bored at 27 and the upper end is threaded to receive a nut 28 which clamps a diaphragm 29 between it and the shouldered upper portion of the plunger 26.

An externally threaded sleeve 30 engages the marginal peripheral portion of the diaphragm and holds such portion against displacement. A trim nut 31 may be threaded to the sleeve to close access to the parts within the projector body enlargement 21. The sleeve 30 is internally threaded to receive a screw member 32 between which, and the nut 28, a spring 33 is compressed. Compression of the spring may be varied, as will be appreciated, to vary the regulated pressure of the water.

The opening in the body enlargement 21 provides a chamber for receiving water which passes through the port 24 from the inlet 11. The entering water passes upwardly through the bore 27 of the plunger 26 and laterally through a series of apertures 34 extending radially of the plunger. The nipple 22 is also formed with a series of radial apertures 35, the bore through the nipple having an annular undercut communicating with the apertures 35 so that fluid communication betwen apertures 34 and 35 is maintained despite the fact that the projection 26 may be rotated relative to the nipple 22.

If the pressure of the water entering the regulator chamber through nipple apertures 35 is too great, such water pressure will flex the diaphragm 29 upwardly against the yieldable opposition of the spring 33. Upward movement of the diaphragm will move attached plunger 26 upwardly and consequently will axially displace apertures 34 and 35 formed respectively in plunger 26 and nipple 22 to provide a throttling effect on the entering water.

Regulated water leaves the pressure regulator chamber through a port 36 and flows to the outlet part 17 of the body passage 14. This outlet part is formed as an annular space and within such space is disposed a sleeve-like baffle member 37 which may have its lower end bearing against the upper surface of the wall 15, and its upper end fitting within an annular recess 38 to maintain the baffle member in centered relation within the outlet part 17.

The lower end of baffle member 37 is formed with a plurality of radial openings 39 and, as shown by the arrows in Figure 1, water leaves the regulator chamber through port 36, passes downwardly in outlet part 17 of body passage 14, then inwardly of baffle member 37 through openings 39 and finally upwardly through baffle member 37. Thus, the water is forced to take a serpentine passage on its way to the outlet 12 and such passage breaks up the turbulence in the water.

In the embodiment shown in Figure 1, the outlet 12 is formed by two upright, slightly inclined, and diverging openings 40, 41. As part of the usual projector, a shield 42 is provided, and to discourage and/or prevent the depositing of unwanted foreign material in the openings 40, 41, a guard plate 43 overlies the openings in spaced relation and in turn has relatively larger openings aligned with the openings 40, 41.

Water from the baffle member 37 will be divided by passage through the openings 40, 41 to provide confluent upright arched streams 44, 45. At their place of confluence, the streams will fan out into a relatively thin, vertically arranged mount of water, as shown at 46, which provides a convenient drinking arrangement for the consumer.

It will be appreciated that a valve (not shown) either foot or hand operated in accordance with usual practice, will be provided to control the flow of water through the projector. Each time the control valve is turned on, water will rush to and through the projector to produce the drinking stream as shown and described. The pressure regulator will automatically compensate for any pressure variations so that the sizes of the arched streams 44, 45 will remain substantially constant. However, it has been found that water turbulence also has an effect on the streams, and particularly the mound 46, and therefor pressure regulation alone did not heretofore maintain uniformity of the stream. With the use of the baffle member 37 the water turbulence was eliminated or, in any event, diminished to a point where the streams, and the mound, were maintained substantially constant.

Figure 1 discloses the use of two confluent streams to produce a mound 46 in the water but if no mound is desired or found necessary, it will be appreciated that only one opening disposed substantially coaxially with the baffle member may be provided to produce a single arching stream.

In the embodiment of the invention disclosed in Figures 2 through 4, details of the projector and regulator have been largely retained and, accordingly, similar parts have been given similar reference numerals with the suffix "a" added.

As before, water from the pressure regulator chamber passes through port 36a into the upper part 17a of body passage 14a. In the present embodiment, the upper portion of passage 14a is slightly angled with respect to upper part 17a, and is interiorly threaded to receive a plug-like member 50 which has an integral guard plate 51.

The inner end of member 50 is reduced in diameter and tubular in form, as shown at 52, to support a baffle member 53 which, in this case, comprises inner and outer baffle portions 54, 55 respectively. The outer baffle portion is generally cup-shape in formation and its skirt wall is secured to the outer wall of the tubular portion 52, either as a press fit or by solder or brazing material.

The skirt wall of the outer baffle portion is formed with a series of flutes 56 which form passage-ways for the water. The inner baffle portion 54 is also fluted and, as best seen in Figure 4, is preferably generally clover-shape in cross-section. The lower end of the inner baffle portion 54 is spaced from the lower wall of the cup-shaped outer baffle portion so that water entering the upper part 17a of the body passage 14a will pass downwardly through the flutes 56 and then reverse itself and pass upwardly through the fluted inner baffle portion 54. Since the flutes 56 are straight and relatively small in cross-section, any swirling action of the water is removed so that after passage through the inner baffle portion 54, the water is relatively free of turbulence.

In the embodiment disclosed in Figures 2 through 4, the plug-like member 50 is formed with a slot 57 having enlargements 58—58 at its opposite ends to provide a generally dumb-bell shape opening as best seen in Figure 3. The guard plate 51 is formed with a registering opening 59 of larger outline so that water issuing from the slot 57, and its end openings may freely pass through opening 59. Thus, a larger volume of water approximating a well defined jet of water is discharged at each border edge of the stream 61, while a thinner body of water in the form of a web unites these border jets. As the water issues from the elongated mouth and is discharged at an inclination to the perpendicular, it has a cross-sectional outline consistent with the shape of the mouth. As the water approaches the high point of the arch, the border edges and control web converge and form a mound 60 which is in the form of a web at right angles to the web issuing from the mouth. Thus, a substantially crescent-shaped mound is produced which is maintained substantially constant by pressure regulation and the elimination of water turbulence.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

A projector for a drinking fountain, comprising a hollow body having an inlet connectable to a source of water and an outlet for issuing water in a stream for drinking purposes, a valve body carried at the side of said hollow body and having a valve bore the axis of which is at an angle of more than 90° to the axis of said inlet, and said bore having a valve chamber at its upper end, the lower end of said bore communicating by means of a first passage with the interior of said hollow body at a lower portion of the latter and said valve chamber communicating with the interior of said hollow body by means of a second passage disposed alongside said first passage and entering the interior of said hollow body at a point spaced upwardly from the entrance of said first passage, valve means in said valve chamber for controlling flow of liquid through said first and second passages, a sleeve disposed within said hollow body to form an upright space therewith, water from said second passage entering said upright space at a point upwardly from the bottom thereof and flowing downwardly in said space and transversely through openings in the lower part of said sleeve to the interior of said sleeve and then upwardly in the latter to the outlet of said hollow body.

References Cited in the file of this patent

UNITED STATES PATENTS

| | | |
|---|---|---|
| 157,256 | Wiard | Nov. 24, 1874 |
| 883,176 | Davis | Mar. 31, 1908 |
| 1,624,081 | Taylor | Apr. 12, 1927 |
| 2,177,444 | Steen | Oct. 24, 1939 |
| 2,270,351 | Schulte | Jan. 20, 1942 |
| 2,624,559 | Hyde | Jan. 6, 1953 |
| 2,645,885 | Benua et al. | July 21, 1953 |